United States Patent
Acharyya et al.

(10) Patent No.: US 11,157,390 B2
(45) Date of Patent: Oct. 26, 2021

(54) AUTOMATIC SOFTWARE DEFECT REPAIR

(71) Applicant: International Business Machines Corporation, Armonk, NY (US)

(72) Inventors: Ajoy Acharyya, Kolkata (IN); Arijit Roy, Bengaluru (IN)

(73) Assignee: International Business Machines Corporation, Armonk, NY (US)

(*) Notice: Subject to any disclaimer, the term of this patent is extended or adjusted under 35 U.S.C. 154(b) by 257 days.

(21) Appl. No.: 16/456,109

(22) Filed: Jun. 28, 2019

(65) Prior Publication Data

US 2020/0409819 A1   Dec. 31, 2020

(51) Int. Cl.
| | |
|---|---|
| *G06F 11/36* | (2006.01) |
| *G06F 11/34* | (2006.01) |
| *G06F 9/445* | (2018.01) |
| *G06F 8/65* | (2018.01) |

(52) U.S. Cl.
CPC ........ *G06F 11/366* (2013.01); *G06F 9/44505* (2013.01); *G06F 11/3476* (2013.01); *G06F 11/3624* (2013.01); *G06F 11/3688* (2013.01); *G06F 8/65* (2013.01)

(58) Field of Classification Search
CPC .............. G06F 11/366; G06F 11/3624; G06F 11/3476; G06F 11/3688; G06F 9/44505; G06F 8/65; G06F 11/36
USPC .................................................. 717/124–167
See application file for complete search history.

(56) References Cited

U.S. PATENT DOCUMENTS

| | | | |
|---|---|---|---|
| 7,596,778 B2* | 9/2009 | Kolawa | G06F 11/3688 717/126 |
| 7,614,043 B2 | 11/2009 | Ognev et al. | |
| 7,861,120 B2 | 12/2010 | Cui | |
| 8,898,633 B2* | 11/2014 | Bryant | G05B 19/056 717/120 |
| 9,921,952 B2 | 3/2018 | Dean et al. | |

(Continued)

OTHER PUBLICATIONS

Monperrus, Martin. "Automatic software repair: a bibliography." ACM Computing Surveys (CSUR) 51.1 (2018): pp. 1-24. (Year: 2018).*

(Continued)

*Primary Examiner* — Satish Rampuria
(74) *Attorney, Agent, or Firm* — Michael A. Petrocelli; Maxine L. Barasch; Keohane & D'Alessandro, PLLC

(57) ABSTRACT

Disclosed embodiments provide techniques for automatic software defect correction of a computer program. Computer program log files are scanned to identify runtime errors, corresponding to software defects. The software defects are analyzed to determine an error type, and identify the source file/code that caused the error. A solution template repository is searched for a solution template corresponding to the identified error type. If a solution template is found, the source code is checked out from the identified source repository. The template is applied to the "original" checked out source file to create a new source file with the fix, which is then uploaded back to the repository. A new software distribution is automatically built with the new source file, and the new software distribution is automatically deployed to the devices that experienced the error. Thus, defects can be automatically detected, repaired, and deployed without human intervention.

17 Claims, 13 Drawing Sheets

(56) References Cited

U.S. PATENT DOCUMENTS

| | | | | |
|---|---|---|---|---|
| 2007/0074149 | A1* | 3/2007 | Ognev | G06F 11/366 |
| | | | | 717/101 |
| 2008/0115107 | A1* | 5/2008 | Arguelles | G06F 11/3668 |
| | | | | 717/124 |
| 2009/0158099 | A1* | 6/2009 | Cui | G06F 11/0778 |
| | | | | 714/57 |
| 2014/0215077 | A1 | 7/2014 | Soudan et al. | |
| 2018/0173525 | A1 | 6/2018 | Suparna et al. | |
| 2018/0276103 | A1 | 9/2018 | Woulfe et al. | |

OTHER PUBLICATIONS

Le Goues, Claire, et al. "Genprog: A generic method for automatic software repair." Ieee transactions on software engineering 38.1 (2011): pp. 54-72. (Year: 2011).*

Demsky, Brian, and Martin Rinard. "Automatic detection and repair of errors in data structures." Acm sigplan notices 38.11 (2003): pp. 78-95. (Year: 2003).*

Gazzola, Luca, Daniela Micucci, and Leonardo Mariani. "Automatic software repair: A survey." IEEE Transactions on Software Engineering 45.1 (2017): pp. 34-67. (Year: 2017).*

Goues, Claire Le, Michael Pradel, and Abhik Roychoudhury. "Automated program repair." Communications of the ACM 62.12 (2019): pp. 56-65. (Year: 2019).*

Ji, Tao, et al. "Automated program repair by using similar code containing fix ingredients." 2016 IEEE 40th Annual Computer Software and Applications Conference (COMPSAC). vol. 1. IEEE, 2016.pp. 197-202 (Year: 2016).*

"Technique to prevent software failures from occurring in a runtime setup", ip.com, IPCOM000238013D, Jul. 25, 2014, 12 pgs.

* cited by examiner

```
...
INFO: Logger Name:                                              ⎫
com.application.corejava.util.logging.ParseClassify             ⎬ 302
Jun 08, 2019 1:19:31 PM                                         ⎭ com.application.corejava.util.logging.ParseClassify main        ⎫
WARNING: Can cause ArrayIndexOutOfBoundsException               ⎬ 304
Jun 08, 2019 1:19:31 PM                                         ⎭ com.application.corejava.util.logging.ParseClassify main        ⎫
ERROR: Exception_Occured ─── 308                                │
            310 ───                                             │ 306
java.lang.ArrayIndexOutOfBoundsException:                       │
                              312 ───                           │
ParseClassify.main(ParseClassify.java:22) ─── 314               ⎭
...
```

FIG. 3A

```
19  public void printArray(int ar[])
20  {
21    for (int i=0; i<=10; i++)
22      System.out.println(ar[i]);
23  }
```

FIG. 4A

```
19  public void printArray(int ar[])
20  {
21    for (int i=0; i<=10; i++)
22      System.out.println(i<ar.length ? ar[i]:null);
23  }
```

FIG. 4B

```
502 ┌─────────────────────────────────────┐
    │ 702  public void print (String str) │
    │ 703  {                              │
    │ 704    message = str.substring(0,5);│
    │ 705    System.out.println(message); │
    │ 706  }                              │
    └─────────────────────────────────────┘
                                        ↖ 504
                                          500

FIG. 5A
```

```
552 ┌──────────────────────────────────────────┐
    │ 702  public static void main (String str)│
    │ 703  {                                   │
    │ 704    message = "default";              │
    │ 705    if(str!=null)                     │
    │ 706      message = str.substring(0,5);   │
    │ 707    System.out.println(message);      │
    │ 708  }                                   │
    └──────────────────────────────────────────┘
                                             ↖ 554
                                               550

FIG. 5B
```

```
600
  ┌─────────────────────────────────────┐
602─│ 200  echo parameter is $1           │
    │ 201  if [ $1 -ge 2 ];then      ←604 │
    │ 202     echo "Max Limit Exceeded"   │
    │ 203  fi                             │
    └─────────────────────────────────────┘
FIG. 6A
```

```
650
  ┌─────────────────────────────────────┐
652─│ 200  echo parameter is $1           │
    │ 201  if [ ${1:-0} -ge 2 ];then ←654 │
    │ 202     echo "Max Limit Exceeded"   │
    │ 203  fi                             │
    └─────────────────────────────────────┘
FIG. 6B
```

ERROR TYPE: java.lang.ArrayIndexOutOfBoundsException — 702

FIX RULE: — 704

Original: %1[%2] — 706

New: %2<%1.length ? %1[%2] : null — 708

ERROR TYPE: -ge: unary operator expected — 752

FIX RULE: — 754

Original: $%1 -ge — 756

New: ${%1:-0} -ge — 758

ERROR TYPE: — 772
java.lang.NullPointerException

FIX RULE: — 774
781

Original: <Prepend>: %1 = %2 — 776

New: — 778
%1 = "default";
if (%2!=null)

FIG. 7C

AUTOMATIC SOFTWARE DEFECT REPAIR

FIELD

The present invention relates generally to computer applications, and more particularly, to automatic software defect repair of computer applications.

BACKGROUND

In the software industry today, there are millions of deployed, network-connected devices that are capable of receiving and installing software updates. Typically, software updates contain defect fixes and/or new features. Defects are typically identified by test teams or end users of the devices, and reported, resulting in a ticket being manually entered into a software defect tracking system. The ticket may then be assigned to a support team for an initial investigation, and if it turns out to be a bona fide error, then may move to a development team for repair. Once repaired, an updated software distribution may then be tested, and upon successful testing, be deployed to the field. This development and operations (DevOps) cycle can be time consuming, and result in delays in getting needed fixes to fielded deployments, causing a suboptimal customer experience.

SUMMARY

In one embodiment, there is provided a computer-implemented method for automatic software defect correction of a computer program, comprising: scanning a log file for the computer program to identify a software defect; identifying an error type for the software defect; identifying a source file for the software defect; identifying a source line number for the software defect; identifying a source repository for the source file; searching a solution template repository for a solution template corresponding to the identified error type, and in response to finding a matching solution template; creating a source code modification in the source file to create a modified source file, wherein the modified source file includes a software defect mitigation; submitting the modified source file to the identified source repository; creating an updated software distribution; and deploying the updated software distribution to one or more electronic computing devices.

In another embodiment, there is provided an electronic computation device comprising: a processor; a memory coupled to the processor, the memory containing instructions, that when executed by the processor, perform the process of: scanning a log file from a computer program to identify a software defect; identifying an error type for the software defect; identifying a source file for the software defect; identifying a source line number for the software defect; identifying a source repository for the source file; searching a solution template repository for a solution template corresponding to the identified error type, and in response to finding a matching solution template; creating a source code modification in the source file to create a modified source file, wherein the modified source file includes a software defect mitigation; submitting the modified source file to the identified source repository; creating an updated software distribution; and deploying the updated software distribution to one or more electronic computing devices.

In yet another embodiment, there is provided a computer program product for an electronic computation device comprising a computer readable storage medium having program instructions embodied therewith, the program instructions executable by a processor to cause the electronic computation device to perform the process of: scanning a log file from a computer program to identify a software defect; identifying an error type for the software defect; identifying a source file for the software defect; identifying a source line number for the software defect; identifying a source repository for the source file; searching a solution template repository for a solution template corresponding to the identified error type, and in response to finding a matching solution template; creating a source code modification in the source file to create a modified source file, wherein the modified source file includes a software defect mitigation; submitting the modified source file to the identified source repository; creating an updated software distribution; and deploying the updated software distribution to one or more electronic computing devices.

BRIEF DESCRIPTION OF THE DRAWINGS

Features of the disclosed embodiments will be more readily understood from the following detailed description of the various aspects of the invention taken in conjunction with the accompanying drawings.

FIGS. 3A-3C show examples of error message in software logs.

FIG. 4A shows an example of Java code that is vulnerable to an array index out of bounds exception.

FIG. 4B shows an example of Java code that prevents an array index out of bounds exception.

FIG. 5A shows an example of Java code that is vulnerable to a null pointer exception.

FIG. 5B shows an example of Java code that prevents a null pointer exception.

FIG. 6A shows an example of a BASH script that contains code vulnerable to a unary operator expected error.

FIG. 6B shows an example of a Bash script that contains code that prevents a unary operator expected error.

FIG. 7A is an example solution template for a JAVA array index out of bounds exception in accordance with embodiments of the present invention.

FIG. 7B is an example solution template for a Bash unary operator expected error in accordance with embodiments of the present invention.

FIG. 7C is an example solution template for a Java null pointer exception in accordance with embodiments of the present invention.

Figure 1:
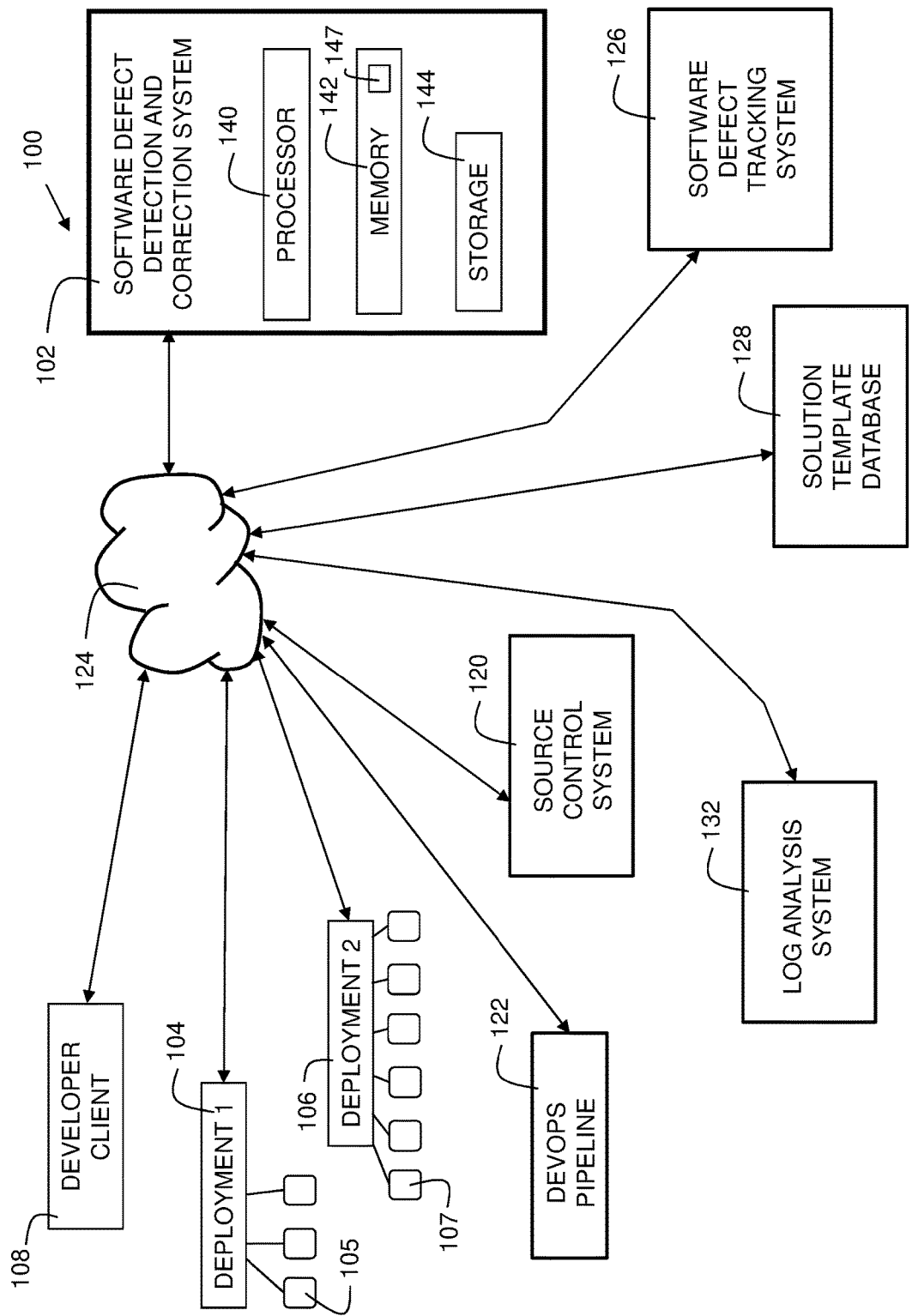
FIG. 1 is an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide techniques for automatic software defect correction of a computer program. Most computer programs create log files during operation to log errors, warnings, and/or other information regarding the operation of the computer programs. Computer program log files are scanned to identify runtime errors, corresponding to software defects. The software defects are further analyzed to determine an error type (e.g., out of memory, null pointer, etc.), source file, source line number corresponding to the software defect, and source repository for the source file. Once the error is identified, a solution template repository is searched for a solution template corresponding to the identified error type. If a solution template is found, then the source code is checked out from the identified source repository. The template is applied to the "original" checked out source file to create a new source file with the fix, which is then uploaded back to the repository. A new software distribution is automatically built with the new source file, and the new software distribution is automatically deployed to the fielded devices that experienced the error. In this way, various errors can be automatically detected, repaired, and deployed without human intervention, increasing the quality of deployed software and improving the overall customer experience.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

FIG. 1 is an environment 100 for embodiments of the present invention. A software defect detection and correction system (SDDACS) 102 may include a processor 140, memory 142, and storage 144. The processor 140 is coupled to the memory 142 such that it can access instructions 147 stored in memory 142. The processor 140 executes the instructions 147, stored in memory 142, in implementation of embodiments of the present invention. Memory 142 may include dynamic random-access memory (DRAM), static random-access memory (SRAM), magnetic storage, and/or a read only memory such as flash, EEPROM, optical storage, or other suitable memory. In some embodiments, the memory 142 may not be a transitory signal per se. The storage 144 may include one or more hard disks, or other suitable storage technology. The SDDACS 102 is connected to network 124. Network 124 is the Internet, a wide area network, a local area network, or any other suitable network. System 102 is an electronic computation device. Note that while one such device is shown in environment 100, in practice, there may be multiple electronic computing devices operating in a distributed manner for load balancing and data redundancy.

Developer client 108 is also connected to network 124. Developer client 108 is a computing device operated by a person (e.g., software developer, administrator, or other stakeholder). The developer client 108 may include a desktop computer, tablet computer, laptop computer, or any other suitable computation device now known or hereafter developed. The developer client may have Ethernet, Bluetooth®, Wi-Fi, or other suitable communication interface to communicate over network 124.

One or more fielded deployments are also part of the environment 100. A deployment is a collection of one or more populations of end-user field-upgradable computing devices. Examples of such devices can include, but are not limited to, smartphones, tablet computers, laptop computers, consumer electronics devices, automobiles, wearable computing devices, datacenter devices, gaming consoles, telecommunications equipment, avionics equipment, and/or networking devices. Deployments can be categorized by operating environment, geographic regions, and/or other conditions. As an example, an application can have one deployment on a Microsoft Windows environment, and another deployment on a Linux environment. Similarly, an application can have one deployment in the United States, and another deployment in Canada. Deployments can be categorized any way that an application developer or product developer chooses, based on the operating conditions and requirements. As shown in FIG. 1, deployment 1 (104) comprises three electronic computing devices, indicated generally as 105. Similarly, deployment 2 (106) comprises six electronic computing devices, indicated generally as 107. In practice, a deployment can comprise many thousands, or even millions of computing devices.

Environment 100 further includes a source control system 120. The source control system 120 can include Git, CVS, SVN, ClearCase, or any other suitable source control system now known or hereafter developed. The source control system supports maintaining a revision history of source code files and other build artifacts.

Environment 100 further includes a DevOps pipeline 122. The DevOps pipeline 122 can include a continuous integration system such as Jenkins, a code collaboration tool such as Gerrit, and/or a code distribution tool to push upgrades to the deployments.

Environment 100 further includes log analysis system 132. The computing devices within each deployment generate log files. Log files are typically text-based files that contain information about the operation of the device. Warnings, errors, and other unexpected conditions are typically written to one or more log files. The computing devices within the deployments then typically upload the log files to the log analysis system 132 on a regular basis. On the log analysis system 132, certain text strings and/or patterns, referred to as "markers", are identified as indicative of an error or other problem warranting investigation. The information in the log file associated with the marker is further parsed to obtain information about the source code location of the error. The log analysis system 132 may include log analysis tools such as Splunk, Loggly, or other suitable log analysis system.

Environment 100 further includes software defect tracking system 126. The software defect tracking system 126 is used for entering software defect information, stakeholder notification, and tracking the history of a software defect from the time of the initial reporting to the resolution/disposition of the software defect. In embodiments, the software defect tracking system 126 can include Bugzilla, Jira, or other suitable system now known or hereafter developed.

Environment 100 further includes a solution template database 128. The solution template database 128 is a solution template repository that contains information regarding solutions for runtime errors detected in source code. When a runtime error is detected, based on log file information, the SDDACS 102 automatically enters a defect in the software defect tracking system 126. The SDDACS 102 then searches the solution template database. If a corresponding solution is found, the SDDACS 102 applies a fix by checking out the appropriate source code repository from the source control system 120, making a source code change, and pushing the source code change through the DevOps pipeline 122 to create an updated software distribution. Upon successful build and test within the DevOps pipeline 122, the updated software distribution is then automatically deployed to the deployment(s) that experienced the defect. In this way, a portion of the runtime errors encountered can be identified, fixed, and deployed without human intervention.

Figure 2:
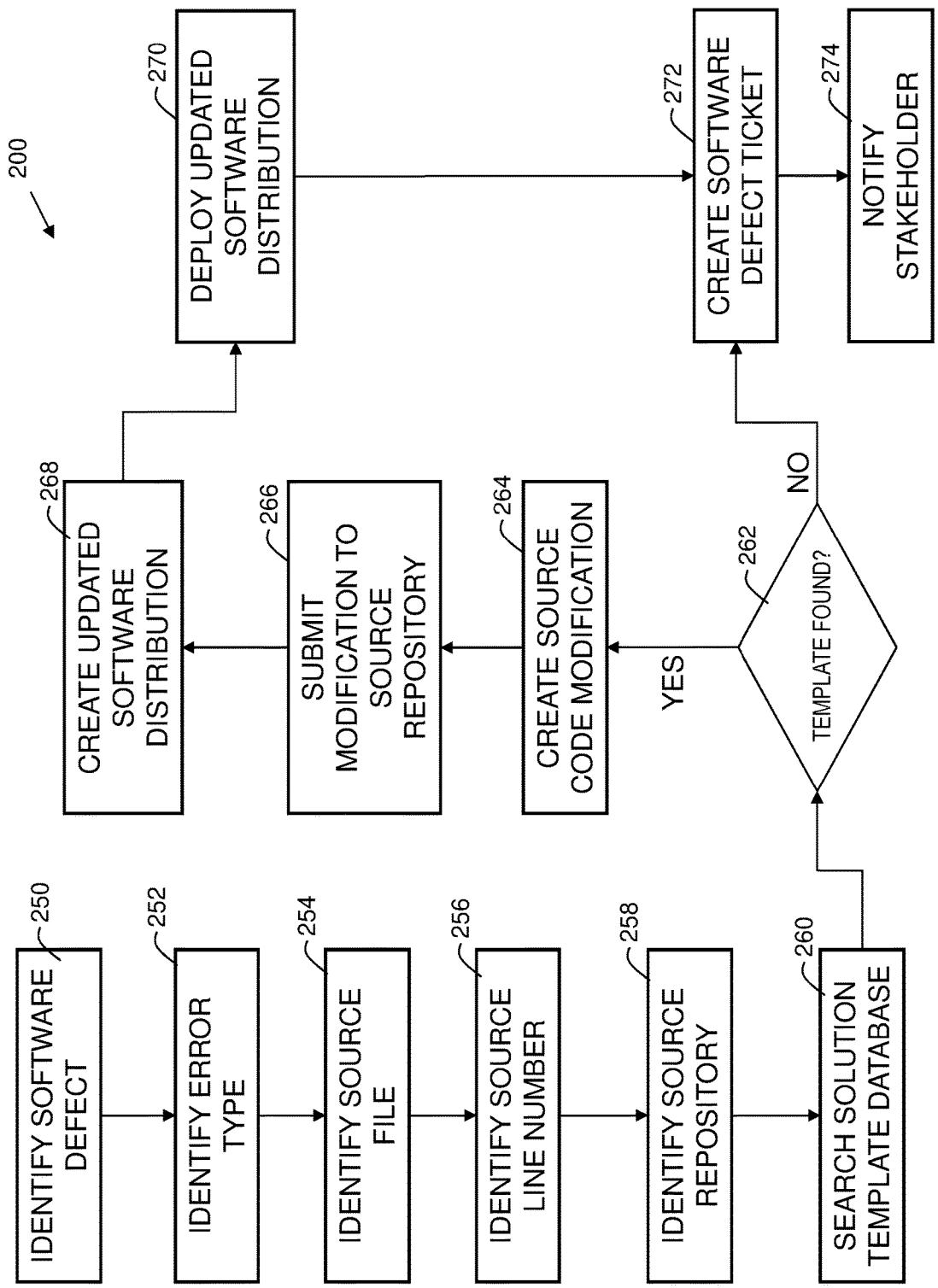
FIG. 2 is a flowchart for embodiments of the present invention.

FIG. 2 is a flowchart 200 for embodiments of the present invention. In process step 250, a software defect is identified. In embodiments, this includes scanning log files for appropriate markers. In some embodiments, the identification of software defects may be performed via device query through SNMP, APIs, or other suitable technique. In process step 252, an error type is identified. Examples of error types include, but are not limited to, out of memory, null pointer, index out of range, and divide by zero. In process step 254, the source file containing the error is identified from the log file. In process step 256, the line number within the source file is identified from the log file. In process step 258, the repository where the source file (identified at 254) is stored is identified. In embodiments, this information may be maintained in a manifest file stored within the SDDACS 102. In embodiments, the manifest file may be a text file or XML file that contains a list of each source code file and its corresponding repository location. In process step 260, the solution template database is searched to determine if there currently exists a template for the error type (identified at step 252) to allow an automatic software defect fix. If, at 262, a matching template is found, then at process step 264, a source code modification is performed based on the template found in the solution template database. At 266, the modification is submitted to the source code repository (e.g., via a code check-in process). At process step 268, an updated software distribution is created (e.g., via the DevOps pipeline 122). At process step 270, the updated software distribution is sent to the affected deployments. This may be performed via file servers such as HTTP servers, FTP servers, or other suitable types of servers. The computing devices within the deployment receive the software distribution from the server(s) and install it. The installation may involve decryption, decompression, and/or storing of a binary image into non-volatile memory such as flash, followed by a restart of the application or a reboot of the computing device. In process step 272, a software defect ticket is automatically created. Thus, embodiments include automatically creating a software defect ticket corresponding to the software defect in a software defect tracking system. In process step 274, a stakeholder is notified. The stakeholder may be a developer, manager, and/or other administrator associated with the product or application. Thus, embodiments include performing an automated stakeholder notification corresponding to the software defect ticket. Note that embodiments are not limited to the order of steps shown in FIG. 2. Other embodiments may utilize a different order, and/or perform multiple steps concurrently.

If, at 262, no template is found, a defect ticket may still be created at 272, and stakeholder(s) notified at 274. If no template is found, then a developer may manually fix the defect. In some situations, the developer may recognize that a template can be used to fix this defect. In embodiments, the developer can submit a new template to the solution template database 128. The next time a similar runtime error is encountered, the issue can be resolved automatically via the template. In this way, over time, the SDDACS 102 becomes more capable in terms of the number of types of software defects that can be automatically reported.

Figure 3B:
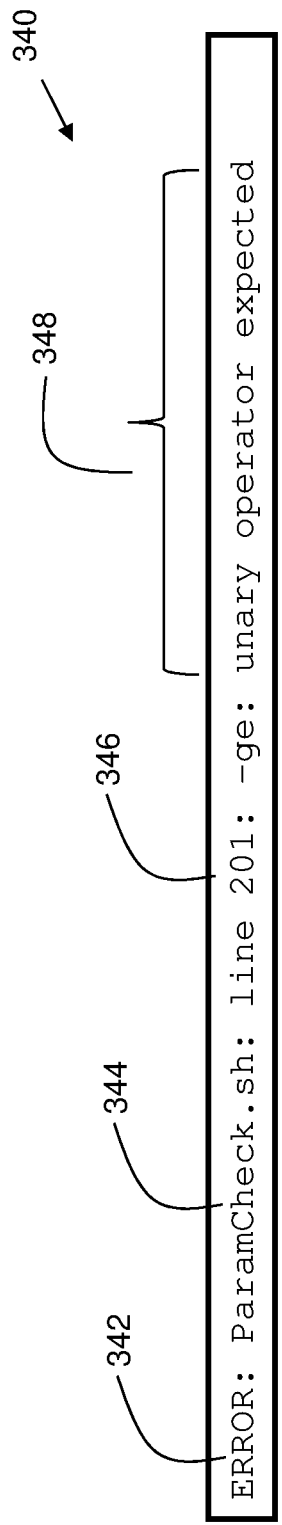
Figure 3C:
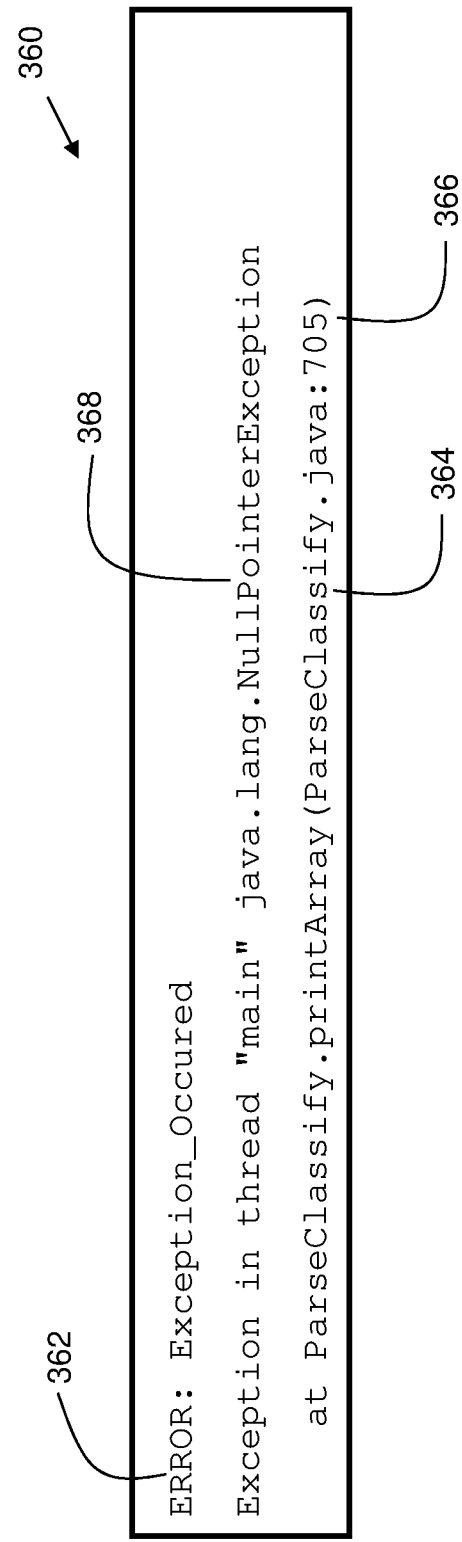

FIGS. 3A-3C show examples of error messages in software logs. Referring now to FIG. 3A, an example log file excerpt 300 for a Java application is shown. Log file excerpt 300 includes various levels of logging, such as INFO, WARNING, and ERROR. Log file excerpt 300 shows an example of an INFO entry 302, a WARNING entry 304, and an ERROR entry 306. Log files may contain other levels such as DEBUG and TRACE, for example. ERROR statements can include further categorization of the error such as MINOR, MAJOR, CRITICAL, FATAL, and/or other designators.

Referring now to the ERROR entry 306, there is an error category 308 that may optionally be used to further categorize the error. In some cases, this may be used for statistical purposes and/or other Big Data applications. The error type 310 describes the specific type of error. As shown, the example in ERROR entry 306 is an Array Index Out Of Bounds exception. The file name (ParseClassify.java) is shown at 312, and the line number within that file (line 22) is shown at 314. The error type 310, file name 312, and line number 314 are parsed from the log file and used by the SDDACS 102 to identify the source code where the fix is to be applied.

Referring now to FIG. 3B, a log file excerpt 340 is shown. Log file excerpt 340 is from a Bash script. The ERROR entry 342 includes a file name 344, a line number 346, and an error type 348. In this case, the file name is ParamCheck.sh, the line number is 201, and the error type is "unary operated expected."

Referring now to FIG. 3C, a log file excerpt 360 is shown. This is another Java example. The ERROR entry 362 includes an error type 368, a file name 364, and a line number indicated at 366. In this case, the file name is ParseClassify.java, the line number is 705, and the error type is a Null Pointer Exception.

Disclosed embodiments are not limited to the Java and Bash examples shown here, and may support a variety of compiled and interpreted languages, including, but not limited to, C, C++, C#, PYTHON, PERL, JAVA, JAVASCRIPT, BASH, RUBY, SQL, PHP, SCALA, and/or any other programming language now known or hereafter developed.

FIG. 4A shows an example 400 of Java code that contains code vulnerable to an array index out of bounds exception. Column 402 indicates line numbers within a source code file. Column 404 indicates a source code line. For example, line 19 contains the source code instruction "public void printArray (int ar[ ])."

The vulnerability of the code occurs at line 22, where the index i of array ar is left unchecked. FIG. 4B shows an example of Java code 450 that contains code that prevents an array index out of bounds exception. Column 452 indicates line numbers within a source code file. Column 454 indicates a source code line. Java code 450 is derived from Java code 400 by applying a template. As can be seen in Java code 450, line 22 now contains a software defect mitigation in the form of a bounds check for the index length. Thus, the println function will not print the array element unless the index i is within bounds. Line 22 of code 450 is automatically inserted by the SDDACS 102 based on a solution template within solution template database 128, replacing line 22 of code 400. Thus, in embodiments, the software defect mitigation is performed at the source line number for the software defect.

FIG. 5A shows an example 500 of Java code that contains code vulnerable to a null pointer exception. Column 502 indicates line numbers within a source code file. Column 504 indicates a source code line. For example, line 704 contains the source code instruction "public void message=str.substring (0,5);." The vulnerability of the code occurs at line 705, where the println function is attempting to print message, but the message parameter is unchecked, which can result in a null pointer exception. FIG. 5B shows an example of Java code 550 that contains code that prevents a null pointer exception. Column 552 indicates line numbers within a source code file. Column 554 indicates a source code line. Java code 550 is derived from Java code 500 by applying a template. As can be seen in Java code 550, lines 704 and 705 include a check to ensure that message is initialized. Thus, the println function will not cause a null pointer exception in the repaired Java code 550. Lines 704 and 705 of code 550 are automatically inserted by the SDDACS 102 based on a solution template within solution template database 128. In this case, the lines containing the fix are not the line where the error occurred, but rather are source code lines prepended (inserted prior) to the line where the error occurred. Thus, in embodiments, the software defect mitigation is performed before the source line number for the software defect.

FIG. 6A shows an example 600 of a Bash script that contains code vulnerable to a unary operator expected error. Column 602 indicates line numbers within a source code file. Column 604 indicates a source code line. For example, line 200 contains the source code instruction "echo parameter is $1." The vulnerability of the code occurs at line 201, where an error occurs if the parameter $1 is empty. FIG. 6B shows an example of Bash script 650 that contains code that prevents a unary operator expected error. Column 652 indicates line numbers within a source code file. Column 654 indicates a source code line. Bash script 650 is derived from Bash script 600 by applying a template. As can be seen in Bash script 650, line 201 now contains a default of zero if the parameter $1 is empty by use of the construct ${1:-0}. Thus, the greater than or equal to (-ge) comparison will not occur with an empty parameter. Line 201 of Bash script 650 is automatically inserted by the SDDACS 102 based on a solution template within solution template database 128, replacing the previous line at 201 in FIG. 6A. The examples illustrated in FIGS. 4A-6B are exemplary, and other types of errors may be addressed by embodiments of the present invention.

FIG. 7A is an example solution template 700 for a Java array index out of bounds exception in accordance with embodiments of the present invention. In embodiments, the matching solution template comprises an array bounds error template. Each template has an error type section, which indicates which type of error that the template can repair, and a fix rule section, which indicates modifications that are applied to create the fix. In embodiments, compilers, tokenizers, parsers and/or other utilities such as Lex, Yacc, Lint, and/or other parsing tools may be used to identify tokens for use within the template.

Referring again to solution template 700, the error type section 702 indicates java.lang.ArrayIndexOutOfBoundsException. The fix rule section 704 includes an original pattern in field 706, and a new pattern in field 708. In embodiments, the templates are used to perform parameter substitution via regular expressions or other search/replace techniques. Referring to field 706, the original pattern is in the form of %1 [%2]. The new pattern in field 708 is in the form of %2<%1.length?%1 [%2]:null.

An end-to-end example of an embodiment of the present invention can now be illustrated. Referring again to FIG. 3A, a log excerpt containing an ERROR entry 306 with a corresponding source file 312 and line number at 314 is shown. This information is extracted by log analysis system 132 and provided to the SDDACS 102. The SDDACS 102 searches the solution template database 128 for a template that can address the error type indicated at 310 in FIG. 3A. Template 700 is identified by the SDDACS 102 as a match since section 702 of template 700 matches the error type indicated at 310 in FIG. 3A. The line number in the source code file is identified from the ERROR entry 306 at 314 as line number 22. Referring now to FIG. 4A, line 22 is shown as System.out.println (ar[i]);. The tokens of ar and i are identified and are in the form of %1 [%2] where %1=ar and %2=i. Referring again to FIG. 7A, the source code is changed as per the rule established in field 708. Using the rule of %2<%1.length?%1 [%2]:null, and replacing every %2 with "i" and every %1 with "ar" results in the corrected source code line of System.out.println (i<ar.length?ar[i]:null);.

The SDDACS 102 checks out the source code file ParseClassify.java (as indicated at 312 in FIG. 3A) from the source control system 120, applies the change as per the template 700, resulting in the fixed code excerpt shown at FIG. 4B. The new version of ParseClassify.java, which is a modified source file that includes the software defect mitigation shown at line 22 in FIG. 4B, is committed to the source control system 120 by the SDDACS 102. A software defect ticket is automatically entered/created in software defect tracking system 126 by the SDDACS 102. A new software image is built (and optionally tested) via DevOps pipeline 122 as initiated by the SDDACS 102. Upon successful build (and optional test) by DevOps pipeline 122, the new software is sent to the computing devices in the designated deployment(s) for upgrade. Optionally, one or more stakeholders are automatically notified of the automated repair activity. In this way, an automated end-to-end solution for identification and repair of software defects, followed by automatic deployment of repaired software is provided. This enables quicker response times, and can result in an overall improved customer experience for end users.

FIG. 7B is an example solution template 750 for a Bash unary operator expected error in accordance with embodiments of the present invention. In embodiments, the matching solution template comprises a unary operator error template. Referring again to solution template 750, the error type section 752 indicates −ge: unary operator expected. The fix rule section 754 includes an original pattern in field 756, and a new pattern in field 758. Referring to field 756, the original pattern is in the form of $%1−ge. The new pattern in field 758 is in the form of ${%1: −0}−ge. When template 750 is applied to the script excerpt of FIG. 6A at line 201 (as indicated by 346 of FIG. 3B), the resulting fixed script excerpt shown at line 201 of FIG. 6B results, based on the parameter substitution. In this case, the %1 is assigned the value of "1", and the resulting fixed line of script, based on the rule in field 758 is shown at line 201 of FIG. 6B.

FIG. 7C is an example solution template 770 for a Java null pointer exception in accordance with embodiments of the present invention. In embodiments, the matching solution template comprises a null object reference template. Referring again to solution template 770, the error type section 772 indicates java.lang.NullPointerExcepton. The fix rule section 774 includes an original pattern in field 776, and a new pattern in field 778. Referring to field 776, the original pattern is in the form of <Prepend>: %1=%2. The original pattern includes a rule directive of <Prepend> as indicated at 781. The rule directive includes a command that describes how to interpret the rule, but is not part of the substitution itself. In some cases, the fix is applied at a line other than the line number reported in the error log. The <Prepend> directive instructs the SDDACS 102 to perform the process at the previous line to the error line. Referring again to FIG. 3C, at 366, in the log file, the error has occurred at line 705 of file ParseClassify.java. Referring now to FIG. 5A, the relevant excerpt of ParseClassify.java is shown, with line 705 indicated as System.out.println (message);. In order to make the fix, based on field 776 of template 770 in FIG. 7C, the <Prepend> directive at 781 is applied first. The <Prepend> directive instructs the SDDACS 102 to go to the previous source code line to apply the fix. Referring again to FIG. 5A, the previous line to line 705 (from FIG. 3C, at 366) is line 704, indicated as message=str.substring (0,5);. Referring again to field 776 of FIG. 7C, the rule indicates %1=%2. In this case, %1 becomes message and %2 becomes str.substring (0,5);. Then, applying the new rule, the fixed code is of the form shown as indicated at field 778 of FIG. 7C. This results in the fixed source code shown in FIG. 5B, where the line at 704 (message="default";) and the line at 705 (if (str!=null)) are inserted before the source line that originally caused the runtime error indicated at log file excerpt 360 of FIG. 3C. The original line 705 is now line 707 in the new file as shown in FIG. 5B. Rule directives such as that indicated at 781 of FIG. 7C provide additional flexibility to allow templates to fix a variety of runtime errors that may be encountered during operation of an application or other software. Thus, in embodiments, the matching solution template includes a rule directive. Note that embodiments of the present invention may operate with application logs, device driver logs, kernel logs, or other suitable logs.

Figure 8:
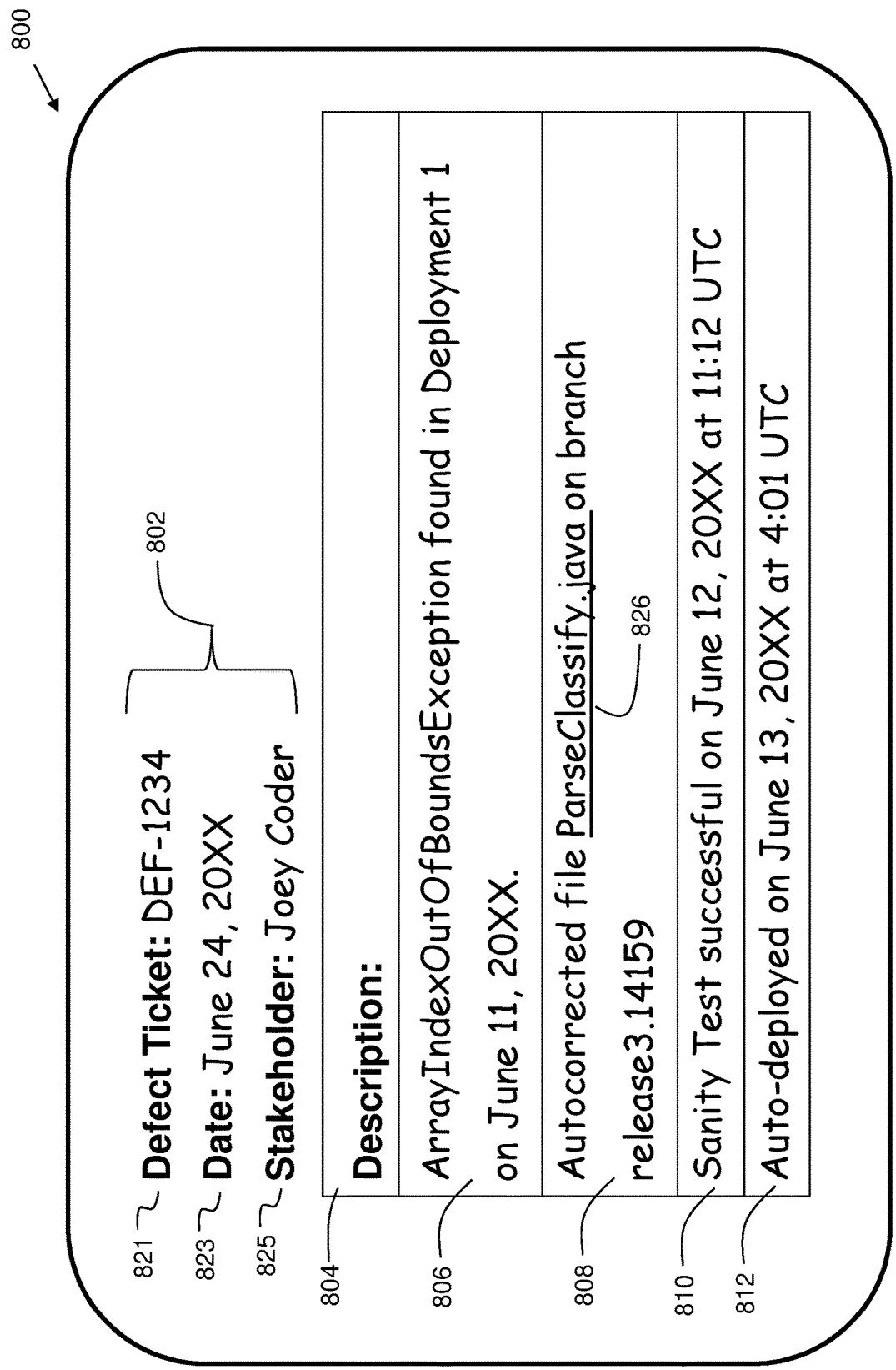
FIG. 8 is an example of an automated stakeholder notification corresponding to a software defect ticket in accordance with embodiments of the present invention.

FIG. 8 is an example of an automated stakeholder notification 800 corresponding to a software defect ticket in accordance with embodiments of the present invention. Metadata field 802 may contain information such as a defect number 821, a date 823, and/or a name of a stakeholder 825. Notification 800 further includes a description section 804. The description section 804 may contain a variety of different fields to describe additional issues found and/or actions taken by the SDDACS 102. Field 806 contains a string that indicates a type of error that was found, which deployment it was found in, and the date it was found. Field 808 contains a string that indicates an action taken by the SDDACS 102. The string at field 808 includes a file name at 826, and a branch that the fixed source code file was checked into using the source control system 120. In some embodiments, the file name at 826 may include a hyperlink that references a diffed display so the stakeholder can view the changes that the SDDACS 102 made by application of a solution template rule. Field 810 contains a string indicating test results from DevOps pipeline 122. Field 812 contains a string indicating a deployment date for the automatically fixed software. In some embodiments, the SDDACS 102 may be configured such that the stakeholder 825 has to confirm/acknowledge the fix before it is deployed. In embodiments, notification 800 may be delivered to the stakeholder via e-mail, text, or other suitable technique.

Figure 9:
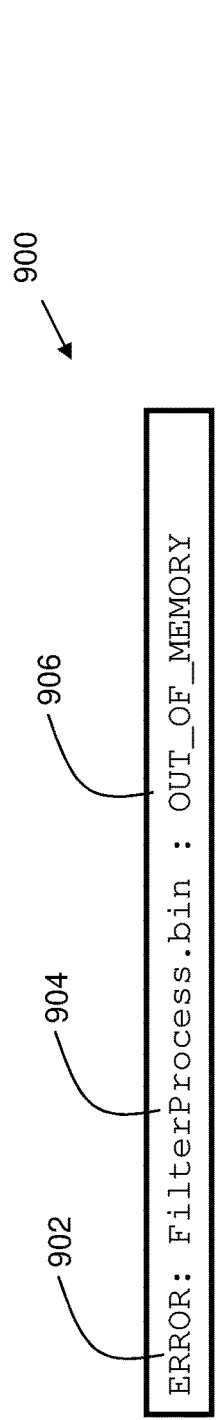
FIG. 9 is an example of a log indicating an out of memory condition.

FIG. 9 is an example of a log 900 indicating an out of memory condition. This is an example of an infrastructure error, while the examples indicated in the log excerpts of FIG. 3A-FIG. 3C indicate non-infrastructure errors. Non-infrastructure errors can be remedied by source code changes in the executing program or script, whereas infrastructure errors are the result of a resource issue, such as memory, bandwidth, storage quotas, or other resource that a program or computer requires to execute properly. Disclosed embodiments can be utilized for both non-infrastructure and infrastructure errors. Referring again to FIG. 9, the ERROR entry 902 indicates a file name 904, and an error type 906. In this example, the file name 904 is FilterProcess.bin, which is a file containing machine code. The error type 906 is OUT_OF_MEMORY. In this example, the FilterProcess.bin file is not directly editable with replacement text, and since the error type 906 indicates an infrastructure error, an infrastructure change is performed by the SDDACS 102.

Figure 10:
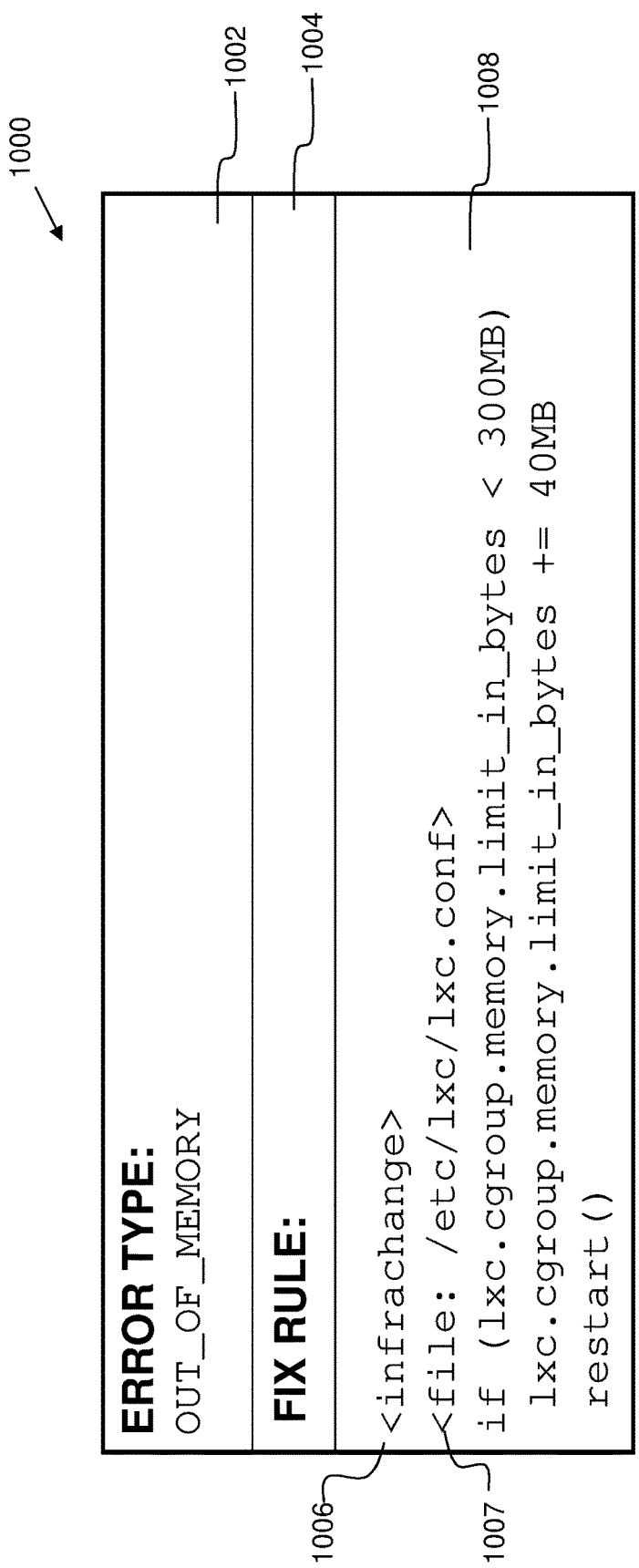
FIG. 10 is an example solution template for an out of memory condition in accordance with embodiments of the present invention.

FIG. 10 is an example solution template 1000 for an out of memory condition in accordance with embodiments of the present invention. Embodiments include identifying an infrastructure-based error condition from the log file, adjusting a resource configuration file in response to the infrastructure-based error condition, and, restarting the computer program to use the adjusted resource configuration file. The error type section 1002 indicates OUT_OF_MEMORY. The fix rule section 1004 includes a rule directive of <infrachange> as indicated at 1006. This directive indicates that a configuration should be changed, rather than changing source code. A second directive 1007 indicates the configuration file that is to be edited when this rule is applied. In this example, the application FilterProcess.bin operates in an LXC container, and the rule at 1008 in FIG. 10 indicates to edit the file /etc/lxc/lxc.conf to increase the memory by 40 MB if the current memory configuration is less than 300 MB, followed by performing a restart of the FilterProcess.bin application.

Figure 11A:
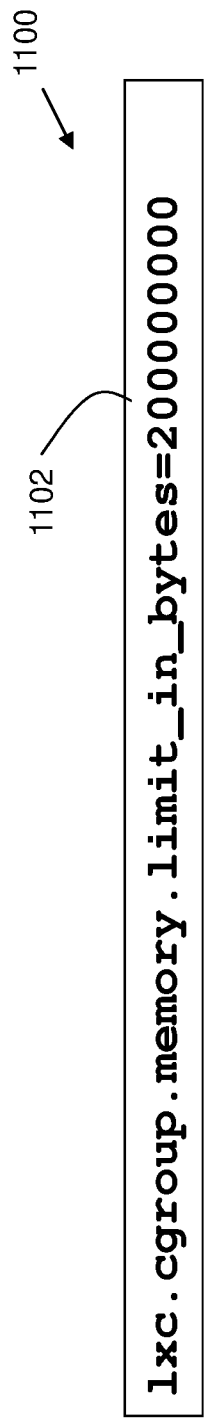
FIG. 11A shows an example configuration file that results in an out of memory condition.
Figure 11B:
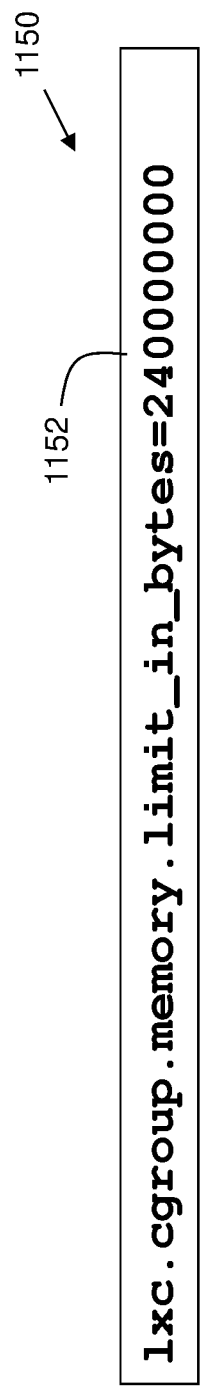
FIG. 11B shows an example configuration file that mitigates an out of memory condition.

FIG. 11A shows an example configuration file excerpt 1100 that results in an out of memory condition. In this example, the current memory is 200 MB as indicated at 1102. FIG. 11B shows an example configuration file excerpt 1150 that mitigates an out of memory condition. In FIG. 11B, the memory is indicated at 240 MB as indicated at 1152. Thus, by applying the rule in field 1008 of solution template 1000, the configuration file excerpt in FIG. 11A is changed to the configuration file excerpt in FIG. 11B, increasing the memory by 40 MB as per the specified rule.

Figure 12:
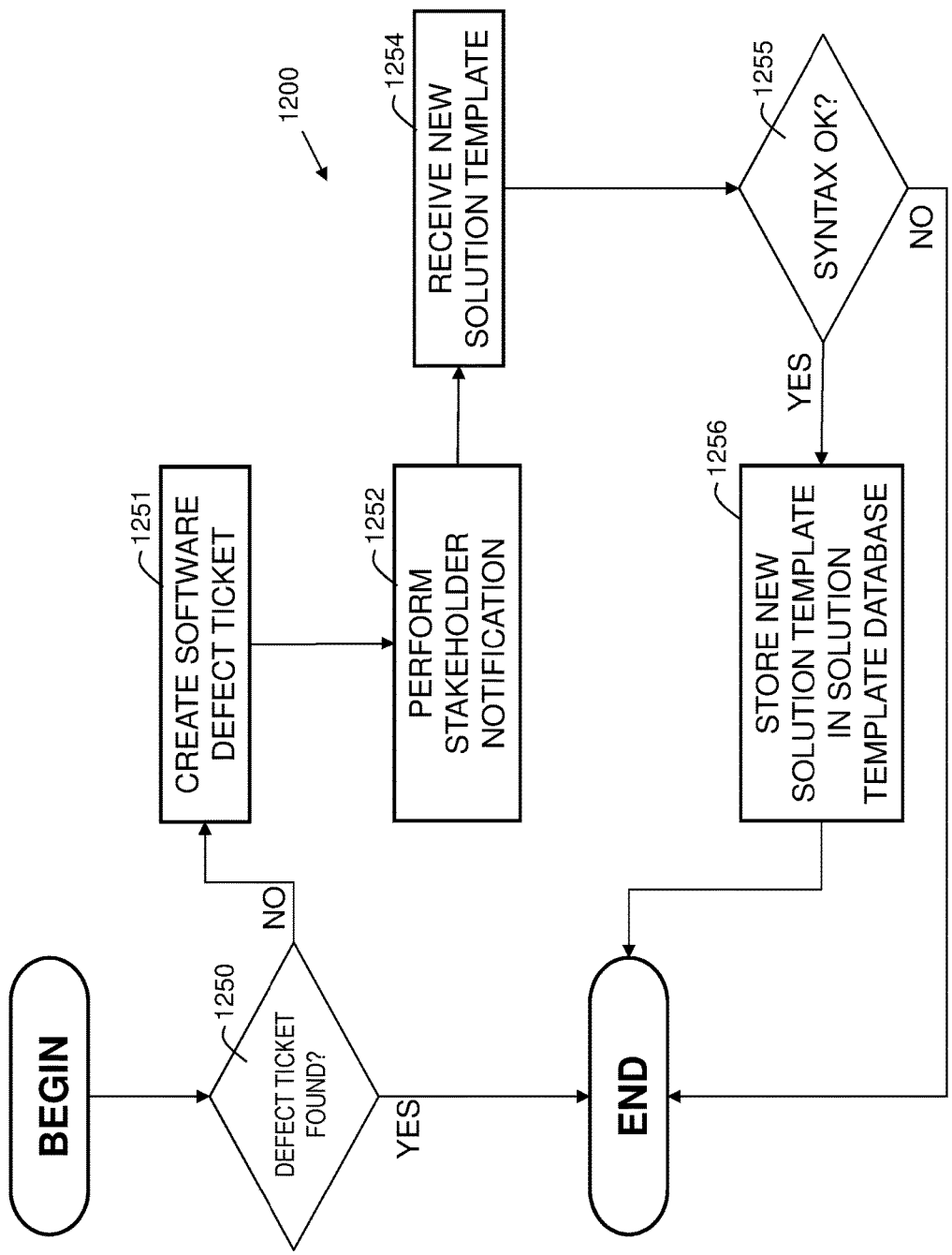
FIG. 12 is a flowchart showing a process for receiving a new solution template in accordance with embodiments of the present invention.

FIG. 12 is a flowchart 1200 showing a process for receiving a new solution template in accordance with embodiments of the present invention. At process step 1250, the SDDACS 102 may, prior to process step 1250, perform a duplicate check prior to creation of the software defect ticket. If an identical software defect ticket exists, then the process ends, since a software defect ticket has already been created previously. In this way, the administrative overhead of duplicate software defect tickets is mitigated. If a defect ticket is not found, then the process proceeds to process step 1251 where a software defect ticket is created. In embodiments, this is created automatically by the SDDACS 102 in software defect tracking system 126. In process step 1252, a stakeholder notification is performed. In some embodiments, the software defect tracking system 126 can perform this function. In the case where a developer creates the fix, and recognizes a pattern that is well suited to a template, he/she creates a template (e.g., such as that shown in FIGS. 7A, 7B, 7C, or FIG. 10), and submits it to the SDDACS 102. The SDDACS 102 receives the new solution template at 1254. At process step 1255, optionally, a syntax check is performed on the template, and if the syntax check is successful, then the process continues to step 1256, where the new solution template is stored in the solution template database 128. If the syntax check is not successful at 1255, then the process ends.

Embodiments can include searching a solution template repository for a solution template corresponding to a second identified error type for a second software defect, and in response to not finding a matching solution template: automatically creating a software defect ticket corresponding to the second software defect in a software defect tracking system; performing an automated stakeholder notification corresponding to the second software defect ticket; and receiving a template for the second software defect; and storing the template for the second software defect in the solution template repository.

As can now be appreciated, disclosed embodiments provide techniques for automatic software defect correction of a computer program. Many types of routine issues that cause runtime errors can be identified, fixed, and deployed without human intervention, thereby offloading developers and administrators for troubleshooting more challenging issues that cannot be automatically fixed. Furthermore, disclosed embodiments allow developers to submit new solution templates as they develop them. In this way, the disclosed embodiments can become more capable over time, being able to automatically fix additional defects once a developer identifies the first instance of such a defect. Thus, disclosed embodiments improve the technical fields of software maintenance and reliability.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for automatic software defect correction of a computer program, comprising:
scanning a plurality of log files for the computer program to identify a software defect, wherein the plurality of log files comprises log files from thousands or millions of deployments;
identifying an error type for the software defect;
identifying a source file for the software defect;
identifying a source line number for the software defect;
identifying a source repository for the source file;
searching a solution template repository for a solution template corresponding to the identified error type, and in response to finding a matching solution template:
creating a source code modification in the source file to create a modified source file, wherein the modified source file includes a software defect mitigation;
submitting the modified source file to the identified source repository;
creating an updated software distribution; and
deploying the updated software distribution to one or more electronic computing devices; and
searching the solution template repository for a solution template corresponding to a second identified error type for a second software defect, and in response to not finding a matching solution template:
automatically creating a second software defect ticket corresponding to the second software defect in a software defect tracking system;
performing an automated stakeholder notification corresponding to the second software defect ticket;
receiving a template for the second software defect; and
storing the template for the second software defect in the solution template repository.

2. The computer-implemented method of claim 1, wherein the software defect mitigation is performed at the source line number for the software defect.

3. The computer-implemented method of claim 1, wherein the software defect mitigation is performed before the source line number for the software defect.

4. The computer-implemented method of claim 3, wherein the matching solution template includes a rule directive.

5. The computer-implemented method of claim 1, further comprising automatically creating a software defect ticket corresponding to the software defect in a software defect tracking system.

6. The computer-implemented method of claim 5, further comprising performing an automated stakeholder notification corresponding to the software defect ticket.

7. The computer-implemented method of claim 1, further comprising:
identifying an infrastructure-based error condition from the log file;
adjusting a resource configuration file in response to the infrastructure-based error condition; and,
restarting the computer program to use the adjusted resource configuration file.

8. The computer-implemented method of claim 7, further comprising automatically creating a software defect ticket corresponding to the software defect in a software defect tracking system.

9. The computer-implemented method of claim 8, further comprising performing an automated stakeholder notification corresponding to the software defect ticket.

10. An electronic computation device comprising:
a processor;
a memory coupled to the processor, the memory containing instructions, that when executed by the processor, perform the process of:
scanning a plurality of log files for the computer program to identify a software defect, wherein the plurality of loci files comprises log files from thousands or millions of deployments;
identifying an error type for the software defect;
identifying a source file for the software defect;
identifying a source line number for the software defect;
identifying a source repository for the source file;
searching a solution template repository for a solution template corresponding to the identified error type, and in response to finding a matching solution template:
creating a source code modification in the source file to create a modified source file, wherein the modified source file includes a software defect mitigation;
submitting the modified source file to the identified source repository;
creating an updated software distribution; and
deploying the updated software distribution to one or more electronic computing devices; and
searching the solution template repository for a solution template corresponding to a second identified error type for a second software defect, and in response to not finding a matching solution template:
automatically creating a second software defect ticket corresponding to the second software defect in a software defect tracking system;
performing an automated stakeholder notification corresponding to the second software defect ticket;
receiving a template for the second software defect; and
storing the template for the second software defect in the solution template repository.

11. The electronic computation device of claim 10 wherein the memory further comprises instructions, that when executed by the processor, perform the process of automatically creating a software defect ticket corresponding to the software defect in a software defect tracking system.

12. The electronic computation device of claim 11 wherein the memory further comprises instructions, that when executed by the processor, perform the process of performing an automated stakeholder notification corresponding to the software defect ticket.

13. The electronic computation device of claim 10 wherein the memory further comprises instructions, that when executed by the processor, perform the process of:
identifying an infrastructure-based error condition from the log file;
adjusting a resource configuration file in response to the infrastructure-based error condition; and,
restarting the computer program to use the adjusted resource configuration file.

14. A computer program product for an electronic computation device comprising a computer readable storage medium having program instructions embodied therewith, the program instructions executable by a processor to cause the electronic computation device to perform the process of:
scanning a plurality of log files for the computer program to identify a software defect, wherein the plurality of loci files comprises log files from thousands or millions of deployments;
identifying an error type for the software defect;
identifying a source file for the software defect;

identifying a source line number for the software defect;
identifying a source repository for the source file;
searching a solution template repository for a solution template corresponding to the identified error type, and in response to finding a matching solution template:
   creating a source code modification in the source file to create a modified source file, wherein the modified source file includes a software defect mitigation;
   submitting the modified source file to the identified source repository;
   creating an updated software distribution; and
   deploying the updated software distribution to one or more electronic computing devices; and
searching the solution template repository for a solution template corresponding to a second identified error type for a second software defect, and in response to not finding a matching solution template:
   automatically creating a second software defect ticket corresponding to the second software defect in a software defect tracking system;
   performing an automated stakeholder notification corresponding to the second software defect ticket;
   receiving a template for the second software defect; and
   storing the template for the second software defect in the solution template repository.

15. The computer program product of claim 14, wherein the computer readable storage medium includes program instructions executable by the processor to cause the electronic computation device to perform the process of automatically creating a software defect ticket corresponding to the software defect in a software defect tracking system.

16. The computer program product of claim 15, wherein the computer readable storage medium includes program instructions executable by the processor to cause the electronic computation device to perform an automated stakeholder notification corresponding to the software defect ticket.

17. The computer program product of claim 14, wherein the computer readable storage medium includes program instructions executable by the processor to cause the electronic computation device to perform the process of:
   identifying an infrastructure-based error condition from the log file;
   adjusting a resource configuration file in response to the infrastructure-based error condition; and
   restarting the computer program to use the adjusted resource configuration file.

* * * * *